APPARATUS FOR TREATING TEXTILE FABRICS

Original Filed Oct. 5, 1953 13 Sheets-Sheet 1

INVENTOR.
Henry Richter,
BY Smith, Olsen, Baird & Galbraith, Atty's.

APPARATUS FOR TREATING TEXTILE FABRICS

Original Filed Oct. 5, 1953 13 Sheets-Sheet 2

INVENTOR.
Henry Richter,
BY Smith, Olsen, Baird
& Bulbrandsen, Attys.

APPARATUS FOR TREATING TEXTILE FABRICS

Original Filed Oct. 5, 1953 13 Sheets-Sheet 3

INVENTOR.
Henry Richter,
BY
Smith, Olsen, Baird
& Gulbrandsen, Attys.

APPARATUS FOR TREATING TEXTILE FABRICS

Original Filed Oct. 5, 1953 13 Sheets-Sheet 4

INVENTOR.
Henry Richter,
BY
Smith, Olsen, Baird
& Gulbrandsen, Atty's.

APPARATUS FOR TREATING TEXTILE FABRICS

Original Filed Oct. 5, 1953 13 Sheets-Sheet 5

INVENTOR.
Henry Richter,
BY
Smith, Olsen, Baird
& Gulbrandsen, Atty's.

APPARATUS FOR TREATING TEXTILE FABRICS

Original Filed Oct. 5, 1953 13 Sheets-Sheet 6

INVENTOR.
Henry Richter,
BY
Smith, Olsen, Baird & Gulbrandsen,
Atty's.

APPARATUS FOR TREATING TEXTILE FABRICS

Original Filed Oct. 5, 1953 13 Sheets-Sheet 7

INVENTOR.
Henry Richter,
BY Smith, Olsen, Baird & Gulbrandsen, Atty's.

APPARATUS FOR TREATING TEXTILE FABRICS

Original Filed Oct. 5, 1953 13 Sheets-Sheet 8

INVENTOR.
Henry Richter,
BY
Smith, Olsen, Baird
& Culbrandson, Attys.

APPARATUS FOR TREATING TEXTILE FABRICS

Original Filed Oct. 5, 1953 13 Sheets-Sheet 9

INVENTOR.
Henry Richter,
BY
Smith, Olsen, Baird
& Gulbrandsen, Atty's.

APPARATUS FOR TREATING TEXTILE FABRICS

Original Filed Oct. 5, 1953 13 Sheets-Sheet 10

INVENTOR.
Henry Richter
BY
Smith, Olsen, Baird & Gulbrandsen,
Atty's.

APPARATUS FOR TREATING TEXTILE FABRICS

Original Filed Oct. 5, 1953 13 Sheets-Sheet 11

INVENTOR.
Henry Richter,
BY
Smith, Olsen, Baird & Gulbrandsen,
Attys.

APPARATUS FOR TREATING TEXTILE FABRICS

Original Filed Oct. 5, 1953 13 Sheets-Sheet 12

INVENTOR.
Henry Richter,
BY
Smith, Olsen, Baird & Gulbrandsen,
Attys.

APPARATUS FOR TREATING TEXTILE FABRICS

Original Filed Oct. 5, 1953 13 Sheets-Sheet 13

INVENTOR.
Henry Richter,
BY
Smith, Olsen, Baird & Gulbrandsen,
Attys.

United States Patent Office

Re. 25,019
Reissued Aug. 8, 1961

25,019

APPARATUS FOR TREATING TEXTILE FABRICS

Henry Richter, Kankakee, Ill., assignor to Paramount Textile Machinery Co., Kankakee, Ill., a corporation of Illinois Original No. 2,856,108, dated Oct. 14, 1958, Ser. No. 384,142, Oct. 5, 1953. Application for reissue Oct. 10, 1960, Ser. No. 61,792
30 Claims. (Cl. 223—76)

Matter enclosed in heavy brackets [ ] appears in the original patent but forms no part of this reissue specification; matter printed in italics indicates the additions made by reissue.

This invention relates to improvements in apparatus for treating textile fabrics and its purpose is to provide novel means for subjecting articles, such as nylon hosiery, to the action of steam and to a subsequent drying operation. The apparatus is intended primarily for effecting the final setting of hosiery but may be used in presetting operations or for drying purposes only.

The principal object of the invention is to provide improved apparatus for treating a large number of articles simultaneously and for replacing them promptly with another batch of untreated articles, whereby successive large batches of articles may be steam treated and dried in rapid succession. A further object is to provide apparatus for treating hosiery and the like comprising a retort adapted to receive a large number of hosiery carrying forms in a chamber of relatively small dimensions whereby the steam consumption is reduced to a minimum. Another object is to provide a long and narrow retort having openings at both ends and a track extending through said retort and said openings, with a plurality of hosiery form carriages mounted on said track to move into and out of said retort through both of said openings and doors for closing said openings, whereby hosiery on the forms of carriages within the retort may be steam treated or dried while other forms on carriages outside of both ends of the retort are being stripped and boarded. Still another object of the invention is to provide a steam treating retort having a plurality of door openings through which hosiery forms are movable into and out of the retort and having ports or louvers through which air may be introduced and withdrawn, in combination with means for automatically effecting in proper timed relation the movements of the hosiery forms, the opening and closing of the doors, the admission of steam and the admission and exhaust of air. Another object is to provide improved means for mounting the forms on a carriage and for collapsing the forms so that they occupy a minimum of space when they are in the retort. A further object is to provide improved means for actuating the carriages and moving them in tandem into and out of the retort. Other objects relate to various features of construction and arrangement which will appear more fully hereinafter.

The nature of the invention will be understood from the following specification taken with the accompanying drawings in which one embodiment is illustrated. In the drawings, FIGURE 1 shows a diagrammatic plan view of and partial horizontal section through the apparatus of the present invention;

FIG. 3 shows a schematic plan view of the track and carriage arrangement by which form supporting carriages are moved in tandem into and out of the retort;

FIG. 4 shows an enlarged side elevation of the retort embodied in the apparatus illustrated in FIGS. 1 and 2, with parts thereof broken away;

FIG. 15b shows the upper right-hand portion of the circuit diagram which is partially illustrated in FIG. 15a;

FIG. 15c shows the lower left-hand portion of the circuit diagram illustrated in FIG. 15a; and FIG. 15d illustrates the lower right-hand portion of the circuit diagram which is partially illustrated in FIG. 15a.

Figure 1:
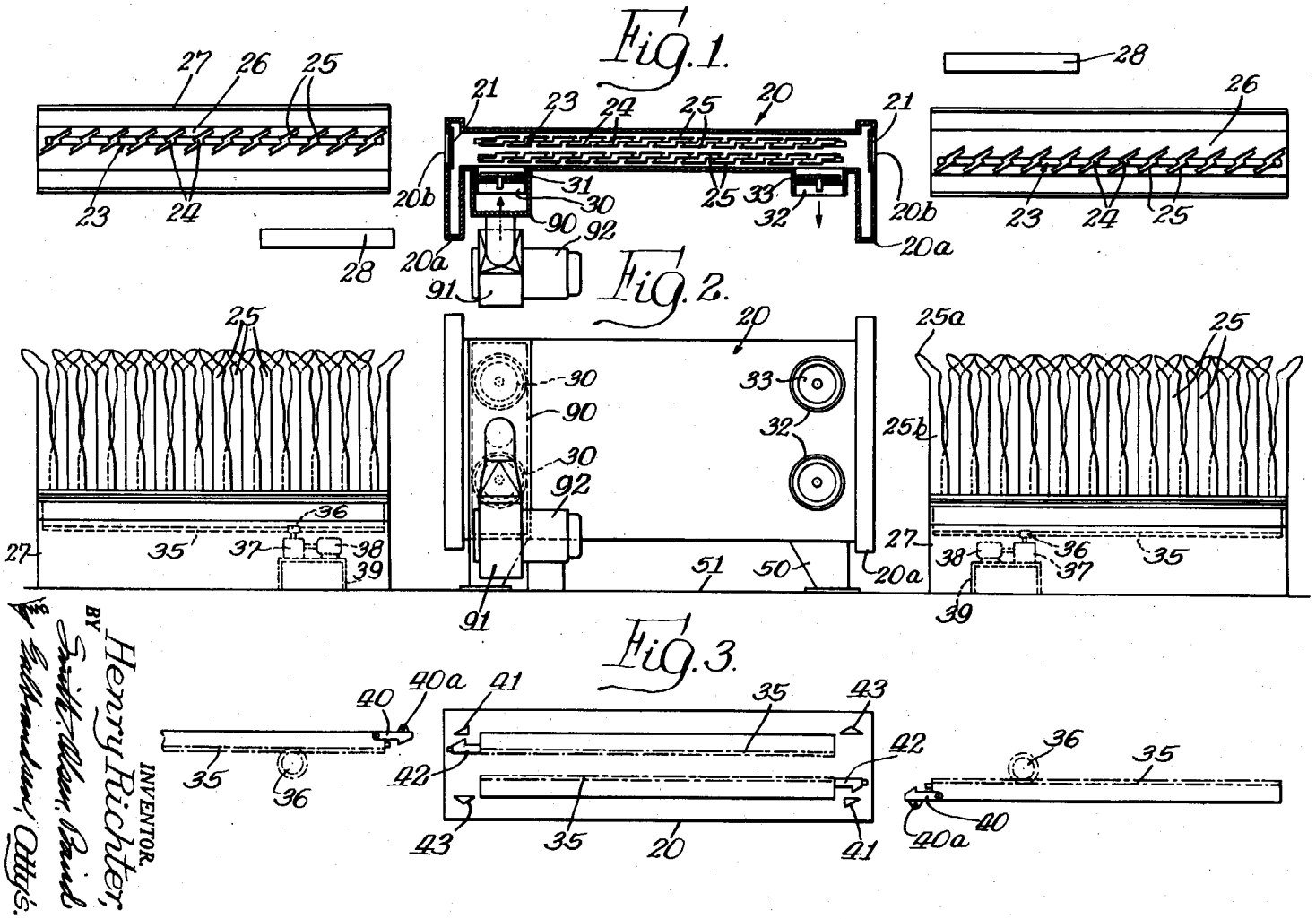
Figure 2:
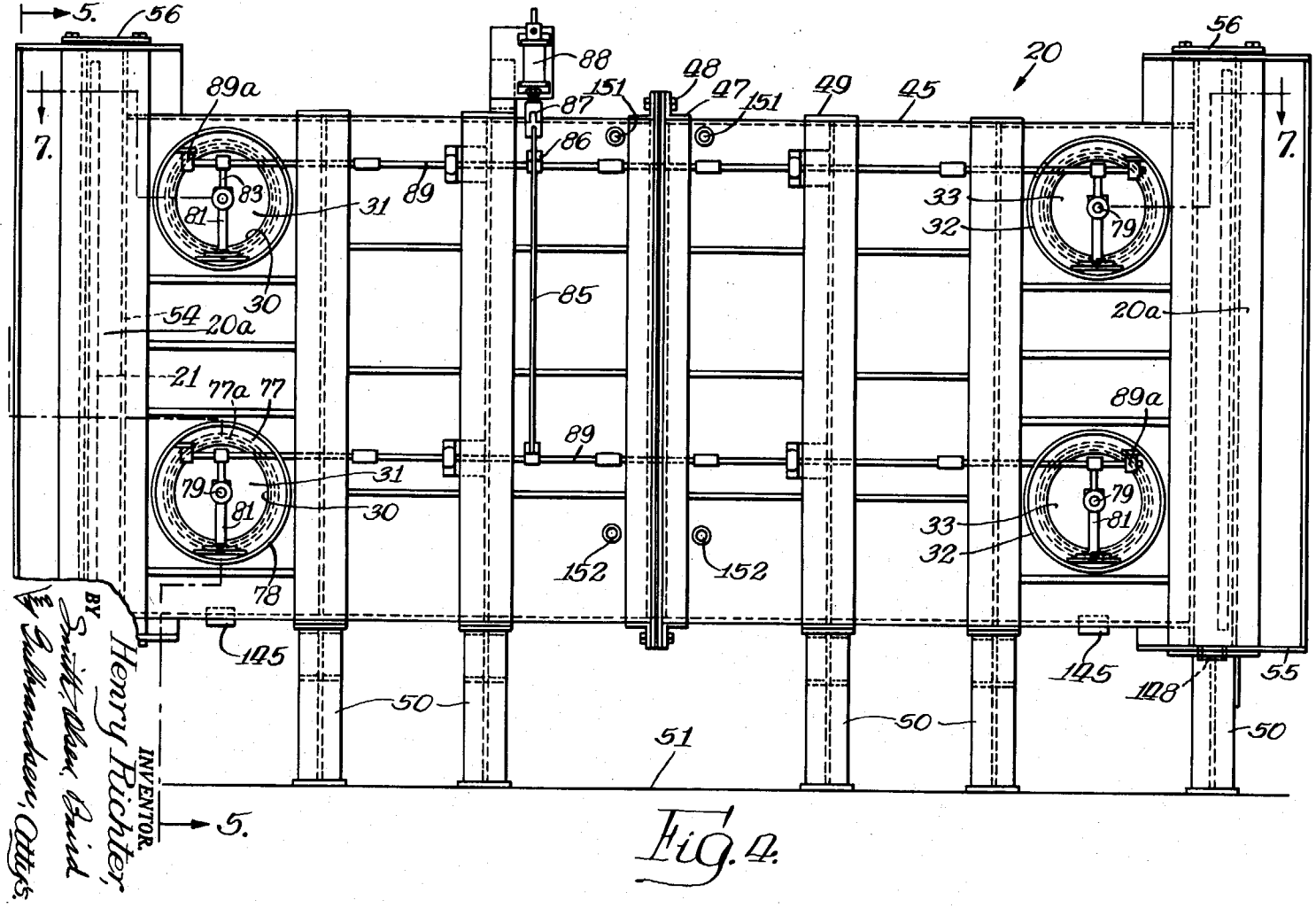
FIG. 2 shows a diagrammatic side elevation of the apparatus illustrated in FIG. 1.

As illustrated in the drawings, the invention comprises an upright retort 20 of rectangular cross section which is provided at its ends with lateral extensions 20a adapted to contain the horizontal movable doors 21 which are arranged to close the openings 20b at the opposite ends of the retort. Mounted within the retort 20 are horizontal tracks 22 adapted to support carriages 23 each of which has mounted thereon a plurality of form supports 24, each carrying two upright forms 25 upon which the hosiery is adapted to be placed for treatment within the retort. The supports 24 are mounted for pivotal movement about vertical axes so that the forms on each carriage may be collapsed into overlapping relationship as shown within the retort 20 in FIG. 1, whereby they occupy a minimum of space. The carriages 23 are adapted to be withdrawn from the retort 20 through the door openings 20b and to be supported by other tracks 26 carried by the frames 27 which are located at opposite ends of the retort and in alignment therewith. When a carriage 23 has been withdrawn from the retort and is supported on tracks 26 outside of the retort, the supports 24 are adapted to be rotated about their vertical axes so that the forms 25 will be extended diagonally to the direction of travel of the carriage and thus be accessible to the operator for stripping and boarding purposes. In the arrangement of the apparatus illustrated, an operator would occupy each of the positions 28 shown in FIG. 1 and would operate upon all of the forms movable on to the adjacent tracks 26 through the adjacent door opening 20b. Two carriages 23 with their hosiery carrying forms 25 are adapted to be present in the retort 20 for treating purposes at the same time and, while the hosiery on these forms is being treated, two other carriages 23 occupy positions on the tracks 26 outside of the retort and are then stripped and boarded by the operators in the positions 28. A carriage carrying forms which are being stripped and boarded at one end of the retort is in alignment with one of the carriages 23 within the retort and the other carriage within the retort is in alignment with another carriage which carries forms which are being stripped and boarded at the opposite end of the retort.

When two carriages 23, having forms 25 which are boarded with hosiery, are in position in the retort 20, the doors 21 are automatically closed and steam is then admitted to the retort to effect the desired steam treatment of the hosiery. At the end of the steam treatment, air inlet ports 30 located in the side wall of the retort adjacent one end thereof are opened by the opening of their valves 31 and, at the same time, steam exhaust ports 32 mounted in the same vertical wall of the retort adjacent its opposite end, are opened by the opening of their valves 33 and air is then admitted to the retort at one end and the steam is exhausted at the other while at the same time the interior chamber of the retort is heated by heating elements, as hereinafter described, so that the hosiery on the forms is quickly dried. At the end of this drying period, the doors 21 are automatically opened and the two carriages which have previously been within the retort are automatically withdrawn while, at the same time, two other carriages carrying forms which have just been boarded by the operators are moved into the retort for treatment.

The movement of the carriages into and out of the retort 20 is effected by mechanism which is illustrated diagrammatically in FIG. 3. Each carriage 23 is provided with a rack bar 35 extending longitudinally thereof and adapted to mesh with a gear 36 actuated through transmission apparatus 37 by an electric motor 38. One of these power units is located beneath the frame 27 at each end of the retort and is supported by an auxiliary frame 39. At the end of a treating cycle and upon completion of a boarding operation at each end of the retort, the motors 37 are actuated to cause the gear 36 to operate the rack bars 35 of those carriages 23 which are then outside of the retort. As each carriage 23 moves from the outside of the retort through the adjacent door opening 20b, the forms on the carriages outside of the retort are collapsed and a pivoted latch 40 mounted on the end thereof engages a cam 41 mounted at the entrance to the retort and is thus caused to interlock with a latch member 42 carried by the end of the aligning carriage which is within the retort. The carriage 23 which is moving into the retort then pushes the carriage within the retort endwise through the door opening at the opposite end of the retort until a point is reached where the rack bar 35 of the outgoing carriage meshes with the gear 36 at the opposite end of the retort whereupon the carriage entering the retort is then pulled by the outgoing carriage as its rack bar moves out of mesh with the gear which had previously been enmeshed therewith. At the proper point in the travel of the two connected carriages, a lug 40a carried by the latch on the forward end of the incoming carriages engages a cam 43 at the discharge end of the retort whereby it is disconnected from the outgoing carriage and is arrested in proper position within the retort for subsequent steam treatment. The outgoing carriage 23 then continues its movement until it occupies a proper position on the tracks 26 at the outside of the retort, whereupon the actuation of the driving gear 36 is arrested. When the outgoing carriage has reached its final position the supports 24 of that form are rotated to move the forms 25 thereof into position for stripping and boarding. This operation of moving two carriages simultaneously takes place at the same time with respect to the two carriages which are parallel with each other so that at the conclusion of the carriage moving operation, two form supporting carriages are again in position outside of the retort to be stripped and boarded and two other carriages are within the retort with their forms collapsed upon each other in readiness for the steam treatment. The ports 30 and 32 are then closed and the doors 21 are then automatically closed, whereupon steam is automatically admitted to the retort to initiate another steam treating operation.

Having described in a general way the principal features of the invention and the operations which are performed in a predetermined sequence, reference will now be made to the detailed construction of the various parts of the apparatus and the means by which they are actuated. Referring particularly to FIGS. 1, 4, 5, 6 and 7, the retort 20 comprises a metal shell 45 which is substantially of rectangular cross section with its larger dimension extending vertically so that the chamber 46 of the retort can accommodate the forms 25 extending vertically. This metal shell is formed in two parts which are joined midway between the ends of the retort by outturned flanges secured together by angle bars 47 connected by bolts 48. The metal shell is reinforced at other points around its periphery by surrounding members 49 of I-beam form, shown in FIG. 7, which sustain the metal shell against the outward pressure of the steam within the chamber 46 during a treating operation. These reinforcing members 49 are connected on the underside of the retort to supporting standards 50 which extend upwardly from the floor 51. At its ends, the metal shell 45 is shaped to provide the lateral extension 20a of the retort which contain the doors 21 and the actuating mechanism therefor. The lateral extension 20a at each end of the retort is formed by I-beams 54 extending upwardly from a bottom plate 55 and closed at the top by a cover plate 56 and the door opening 20a is bounded by a metal plate 57 which forms a seat 57a for the door 21 which is in the form of a flat metal plate having a sealing member 58, of rubber or the like, secured thereto to engage the seat 57a when the door is in closed position as shown in FIG. 6.

Figure 8:
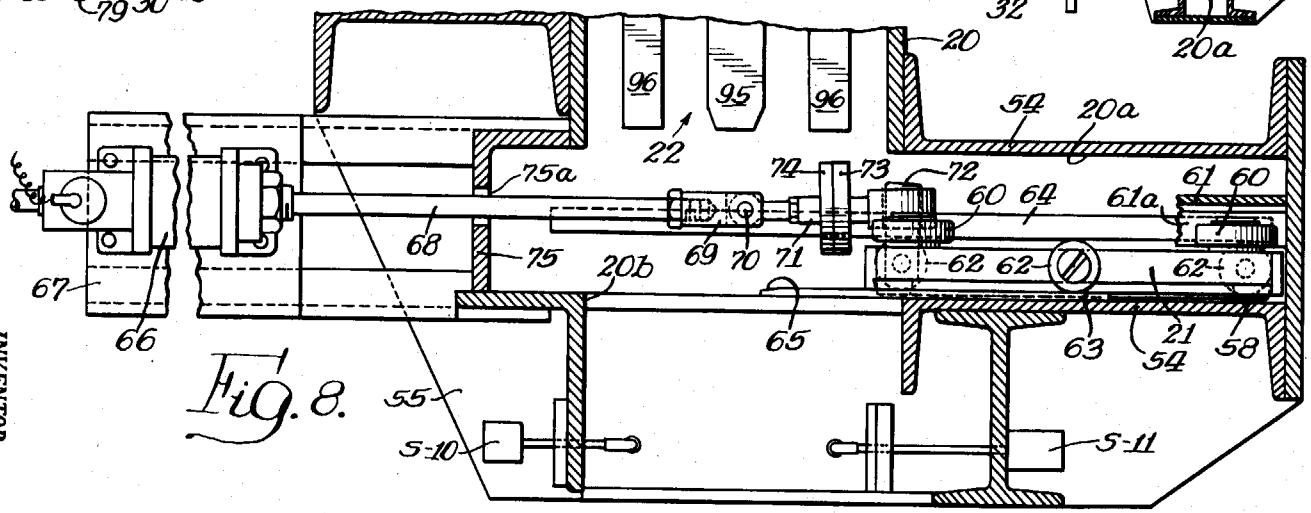
FIG. 8 shows a horizontal section taken on the line 8—8 of FIG. 5.

The door 21 is supported at the top by rollers 60 which are adapted to travel on the lower flange of a channel-shaped track member 61 secured to the top wall of the retort and extending transversely of the door opening. This member 61 is provided with a bar 61a upon which the rollers 60 travel and the door is provided at its top with a single roller 62 adapted to travel about a vertical axis in contact with a guide strip 63 secured to the top portion of the member 57. At its lower edge, there are two rollers 62 secured to the bottom edge of the door and mounted to travel between the lower flange 57b of the door frame and a bar 64 which is secured to the bottom wall of the retort. With this arrangement, each door is mounted somewhat loosely adjacent the door frame 57 and, when steam is admitted to the retort with the door in closed position the steam pressure moves the door outwardly to cause the gaskets 58 to seat against the door frame and form a fluid-tight closure. When the door is moved to the open position which is shown in FIG. 8, the rollers 62 engage cams 65 on guide strips 63 which guide the door away from the door frame and separate the gasket 58 from the surface 57a, thereby facilitating the movement of the door.

Each door is actuated by a cylinder 66 mounted on a support 67 extending laterally from the retort and adapted to receive compressed air or the like for actuating its piston in either direction. This piston is connected to a piston rod 68 which is adjustably connected to a fitting 69 having a pivotal connection at 70 to a connecting rod 71 which is pivoted at 72 to the door. A disk 73 is included in the connection 71 and carries a sealing ring 74 of rubber or the like which is adapted to bear against the longitudinal end wall 75 of the retort extension 20a in order to form a fluid-tight seal about the apertures 75a, through which the piston rod 68 extends, when the door is in its closed position and steam has been admitted to the interior chamber 46 of the retort. Compressed air or the like is admitted to the cylinder 66 to control the opening and closing of each door 21 in proper timed relation to the other operations of the apertures as hereinafter more fully described.

Figure 5:
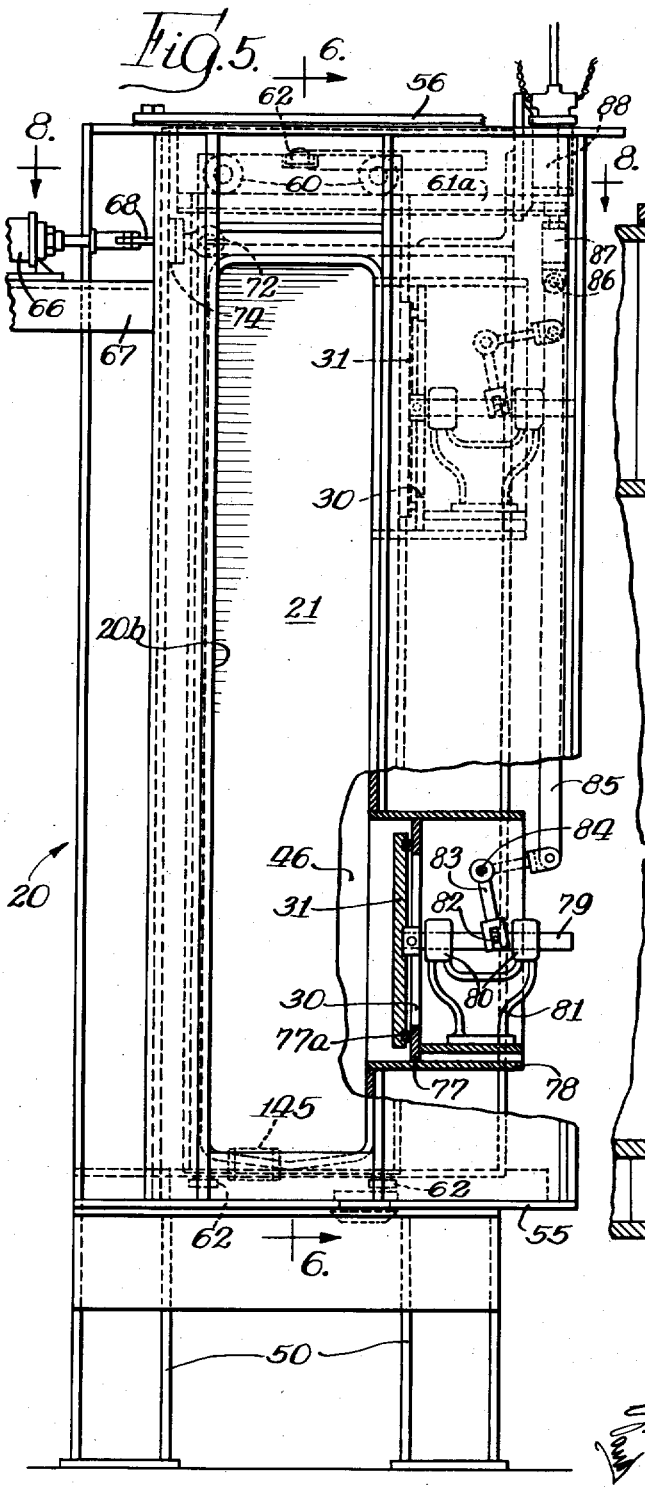
FIG. 5 is a view taken on the line 5—5 of FIG. 4 showing an enlarged end elevation of the retort embodied in the apparatus shown in FIGS. 1 and 2 with parts broken away and other parts shown in vertical section.
Figure 6:
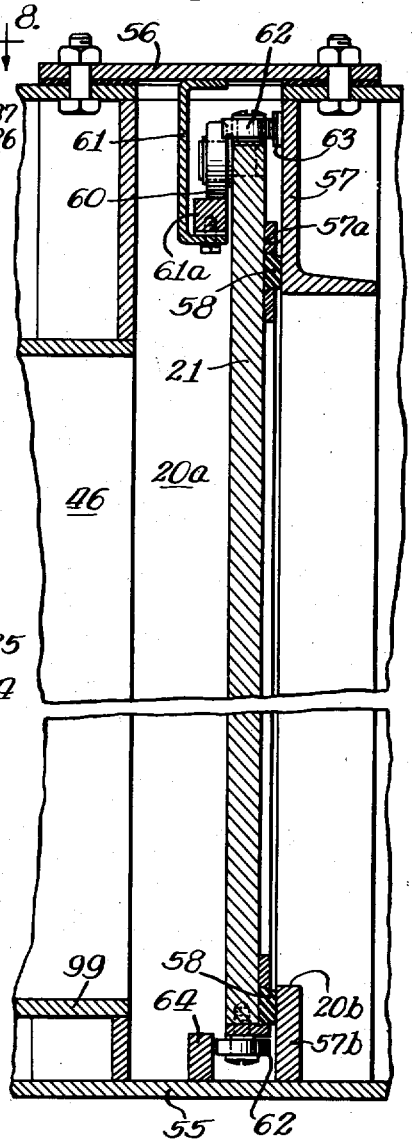
FIG. 6 shows a sectional view taken on the line 6—6 of FIG. 5.

The ports 30 and 32 through which air is admitted to and exhausted from the interior chamber 46, as previously mentioned, are shown particularly in FIG. 5 along with the operating mechanism of the valves 31 and 32. Since this mechanism is the same for each air inlet and exhaust port and the valves associated therewith, the description of one of them will suffice for all. Each port 30 or 32 is formed as a circular hole in a plate 77 which is mounted in a cylinder 78 secured in an aperture formed in the wall of the retort. The valve member 31 or 33 has an annular sealing ring 77a which seats against the plate 77 so that when the valve is in its closed position a fluid-tight closure is formed to prevent the escape of steam from the interior chamber 46. Each valve member 31 or 33 is mounted on a stem 79 mounted to slide in hubs 80 carried by a bracket 81. Each stem 79 is provided with a projecting pin 82 engaged by the bifurcated extremity of one arm of a bell crank lever 83 pivoted at the point 84. The other arm of this bell crank lever 83 is pivotally connected to an upwardly extending link 85 having a pivotal connection at 86 to a piston rod 87 adapted to be actuated by a piston mounted in a cylinder 88 to which air or other compressed fluid may be admitted.

Figure 7:
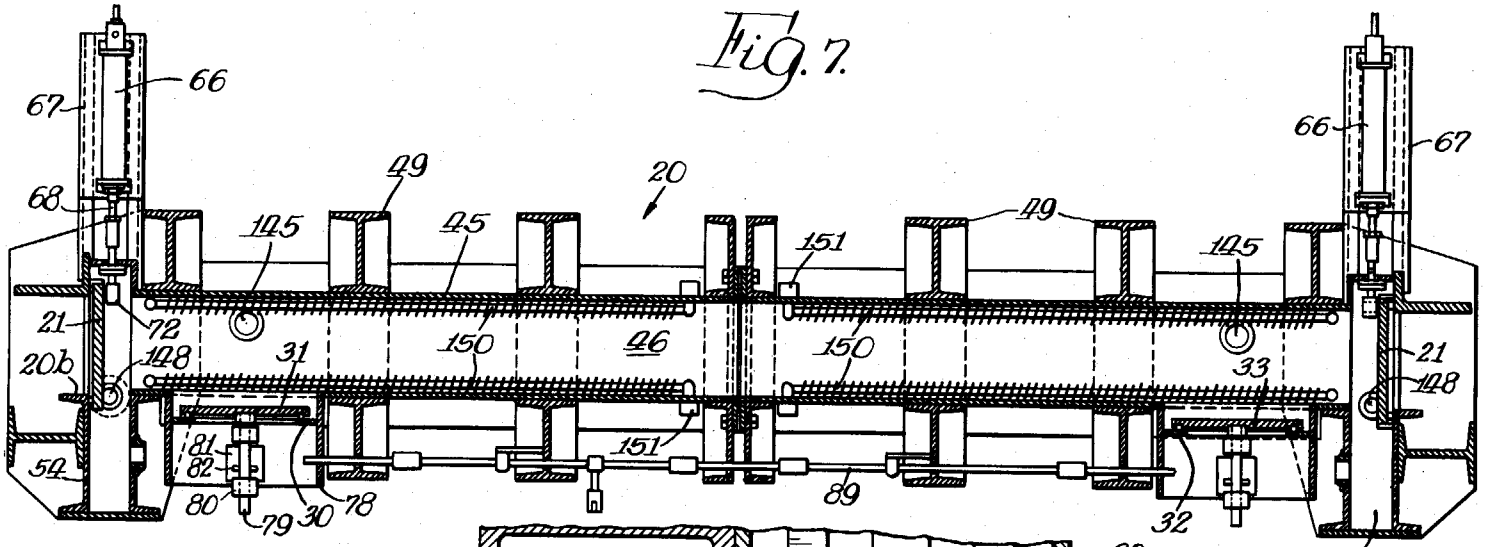
FIG. 7 shows a horizontal section taken on the line 7—7 of FIG. 4.

As will be seen from FIGS. 4, 5 and 7, the pivot 84 of each bell crank lever 83 for both sets of valves 31 and 33 is formed by a shaft 89 which is journaled in bearings 89a secured to the inner sides of the cylindrical member 78 and the shafts 89 are actuated by the common cylinder 88 so that all of the valves 31 and 32 are actuated simultaneously.

The tubes of the inlet ports 30 are enclosed within a housing 90 which is a box-like structure attached to the outer side wall of the retort and forming a closed air chamber communicating with the inlet ports 30 and adapted to receive air under pressure from a blower 91 driven by an electric motor 92. When the ports are opened the blower is automatically operated to cause air to flow under pressure through the chamber of the retort.

The construction of the carriages 23 and the supporting tracks 22 and 26 will now be described with particular reference to FIGS. 1, 2, 9, 10, 11, 12 and 13. As shown particularly in FIG. 13, each track 22 within the retort 20 comprises three track members including a central track member 95 and two side track members 96 which are in the form of flat metal plates extending in a horizontal plane longitudinally of the retort where they are supported by an intermediate pedestal 97 and two side pedestals 98 carried by a bottom plate 99 secured to lugs 100 extending upwardly from the bottom wall of the retort. The track members 95 and 96 are adapted to support two of the carriages 23 when these carriages are in position within the retort in parallel relationship to each other, as shown in FIG. 1, and they extend substantially throughout the length of the retort.

Each carriage 23 comprises a plurality of blocks 101 which are arranged in series longitudinally of the carriage and secured together by a top plate 102 which extends substantially throughout the length of the carriage. The blocks 101 are also secured together at their lower extremities by side bars 103 and by the rack bars 35, heretofore referred to, which are adapted to mesh with the driving gears 36. The unitary rigid carriage structure which is thus formed is adapted to be supported and guided on the track members 22 and 26 by means of cylindrical rollers 104 which are mounted by means of roller bearings upon the pins 105 secured in the carriage blocks 101 and projecting from the opposite faces thereof. Each carriage block 101 is provided with two pins 105 which are offset both vertically and longitudinally of the apparatus so that when the carriage is in the retort, for example, two rollers 104 will contact the upper faces of the track members 95 and 96 while the other two rollers 104 mounted on the same carriage block will travel in proximity to the under surface of the two track members 95 and 96, thus restraining the carriage against upward movement with respect to its supporting track members while at the same time supporting it for free travel longitudinally of the apparatus.

The track structure which has just been described with reference to the tracks 22 within the retort is repeated in substantially the same manner in the track structures 26 which are located outside of the retort at opposite ends thereof. This track structure 26 comprises three track members including a central track member 95a and two side track members 96a which are identical with the track members 95 and 96, respectively, and which are mounted in alignment therewith both horizontally and vertically so that when a carriage 23 moves out of the retort it will be supported by the track members 95a and 96a which act as continuations of the track members within the retort. These track members 95a and 96a, located outside of the retort, are supported by the frames 27, previously referred to, each of which comprises a pair of side frames 107 secured at their lower ends to the frame members 108 secured to the floor 51. The members 108 are connected at each end of the frame structure by angle bars 109 and the top ends of the side frame members 107 are connected to angle bars 110 having secured thereto a transverse plate 111. The plates 110 and 111 at opposite ends of the same frame structure 27 are connected by longitudinal bars 112. The angle bars 110 have their top flanges 110a connected to supporting plates 113 to which the outer margins of the track members 96a are secured. These bars 113 are connected by parts 113a to lower plates 113b which are secured to flanges 114 extending inwardly from the side frame members 107. The plates 113b have arms 115 extending downwardly therefrom and a tie rod 120 extends transversely of the apparatus through the lower end of two arms 115 which are located at opposite sides of the frame structure. The threaded ends of these tie rods are engaged by nuts 121 by which the track supporting structures at opposite sides of the frame are tied together. The tie rod 120 is threaded at an intermediate point for engagement by nuts 122 which secure in place the track supporting standard 123 having a boss 123a engaged by the tie rod. These standards 123 extend upwardly and support the intermediate track member 95a as well as an upright cam carrying bar 125 which is mounted above the intermediate track member. At one side of the machine the bar 112 which connects the side frame members at opposite ends of the machine is constructed in the form of a cam bar 112a adapted to perform the functions of the cam bar 125 with respect to the form carriages at that side of the machine, as hereinafter more fully described.

Each carriage block 101 is provided at one end with a pair of projecting ears 101a between which there is rotatably mounted a roller 127 which is adapted to travel freely between the adjacent edges of two of the track members 95 and 96 or 95a and 96a, with some clearance to permit freedom of movement, as shown in FIGS.

Figure 13:
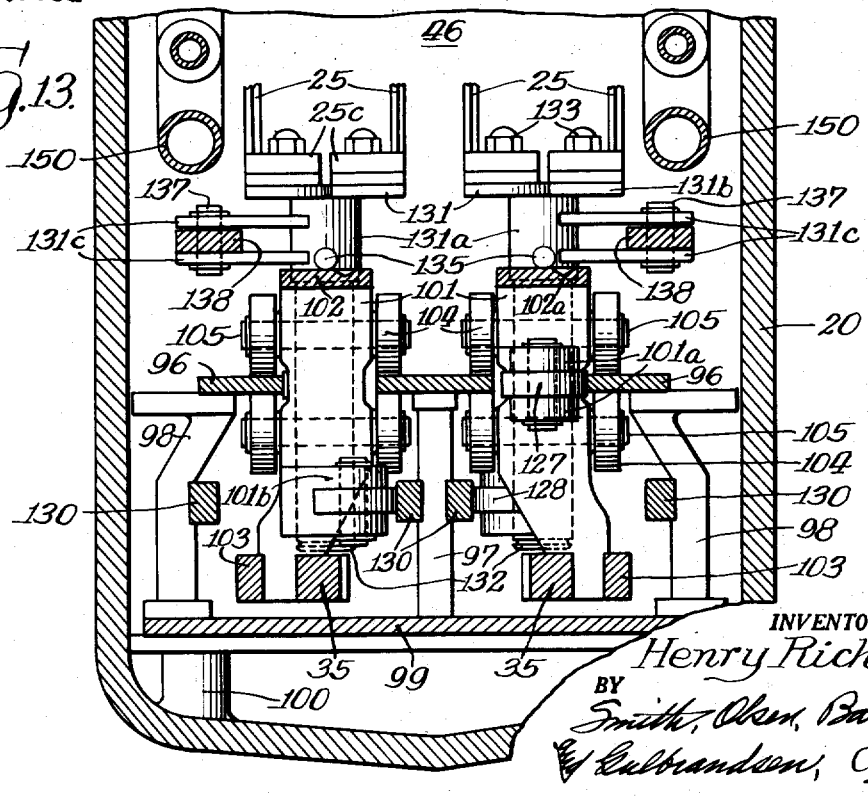
FIG. 13 shows a vertical section through the retort illustrated in FIGS. 1, 2 and 5, illustrating two form supporting carriages in position on the tracks within the retort.
Figure 14:
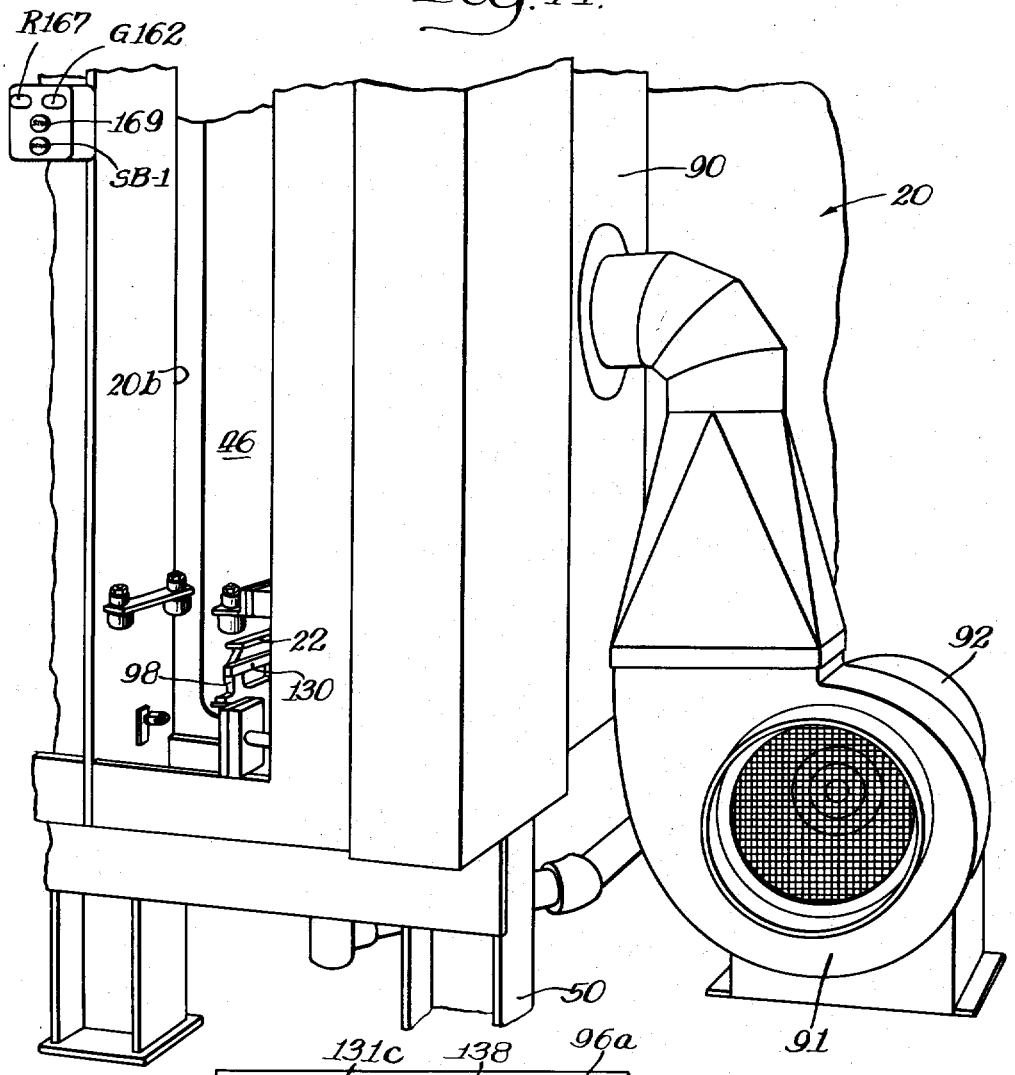
FIG. 14 is a perspective view of part of the lower left-hand portion of the retort, as viewed in FIG. 1, showing the housing for the air inlet ports and the blower for discharging air through the housing into the retort.
Figure 14A:
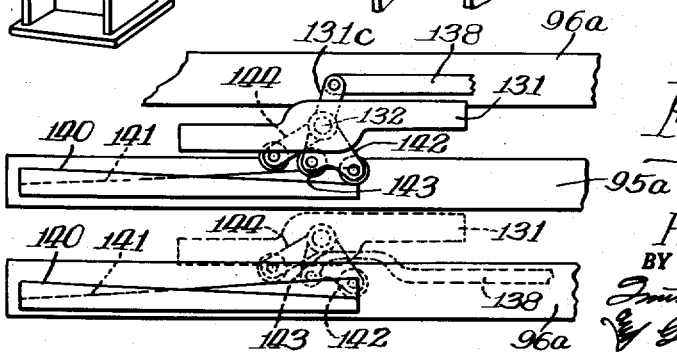
FIG. 14a is a diagrammatic plan view of a portion of the outer end of one of the tracks outside of the retort, showing the cams and crank arms for rotating the form supports and the links for connecting the form supports of each carriage.

12 and 13. The action of these rollers is supplemented by that of other rollers 128 which are mounted at a lower level on arm 101b which extend diagonally from the carriage blocks 101, as shown particularly in FIGS. 9 and 11. The rollers 128 are adapted to engage the vertical faces of guide bars 130. Within the retort 20, these guide bars 130 are mounted upon the central supporting pedestals 97 and upon the side pedestals 98 as shown in FIG. 13 and, in connection with the track structures 27 located outside of the retort, these guide bars 130 are carried by the flanges 113b and by the central pedestal 123. The arms 101b which carry the rollers 128 are directed angularly in opposite directions on alternate carriage blocks 101 so that the roller 128 carried by one carriage block will contact the guide bar 130 at one side of the carriage while the roller 128 mounted on the next adjacent carriage block 101 will contact the guide bar 130 at the opposite side of the path of travel of the carriage. By means of the rollers 127 and 128, the carriages 23 are restrained in their lateral movement while traveling longitudinally upon the horizontal track members 95 and 96 of 95a and 96a.

Figure 9:
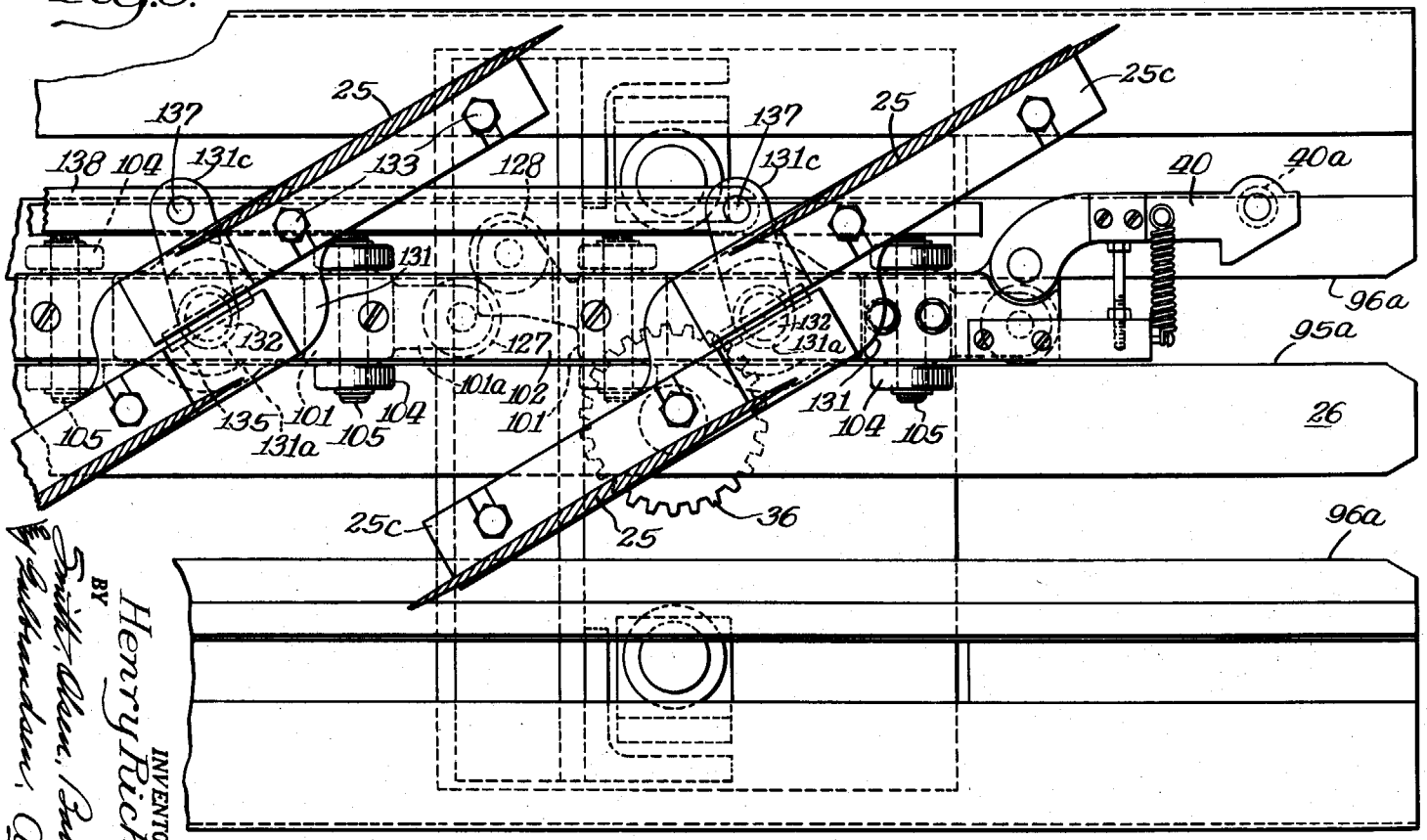
FIG. 9 shows an enlarged top plan view of the right-hand portion of the track and form carriage structure on the outside of the retort at the left-hand end thereof, as viewed in FIG. 1, with the forms shown in horizontal section.
Figure 10:
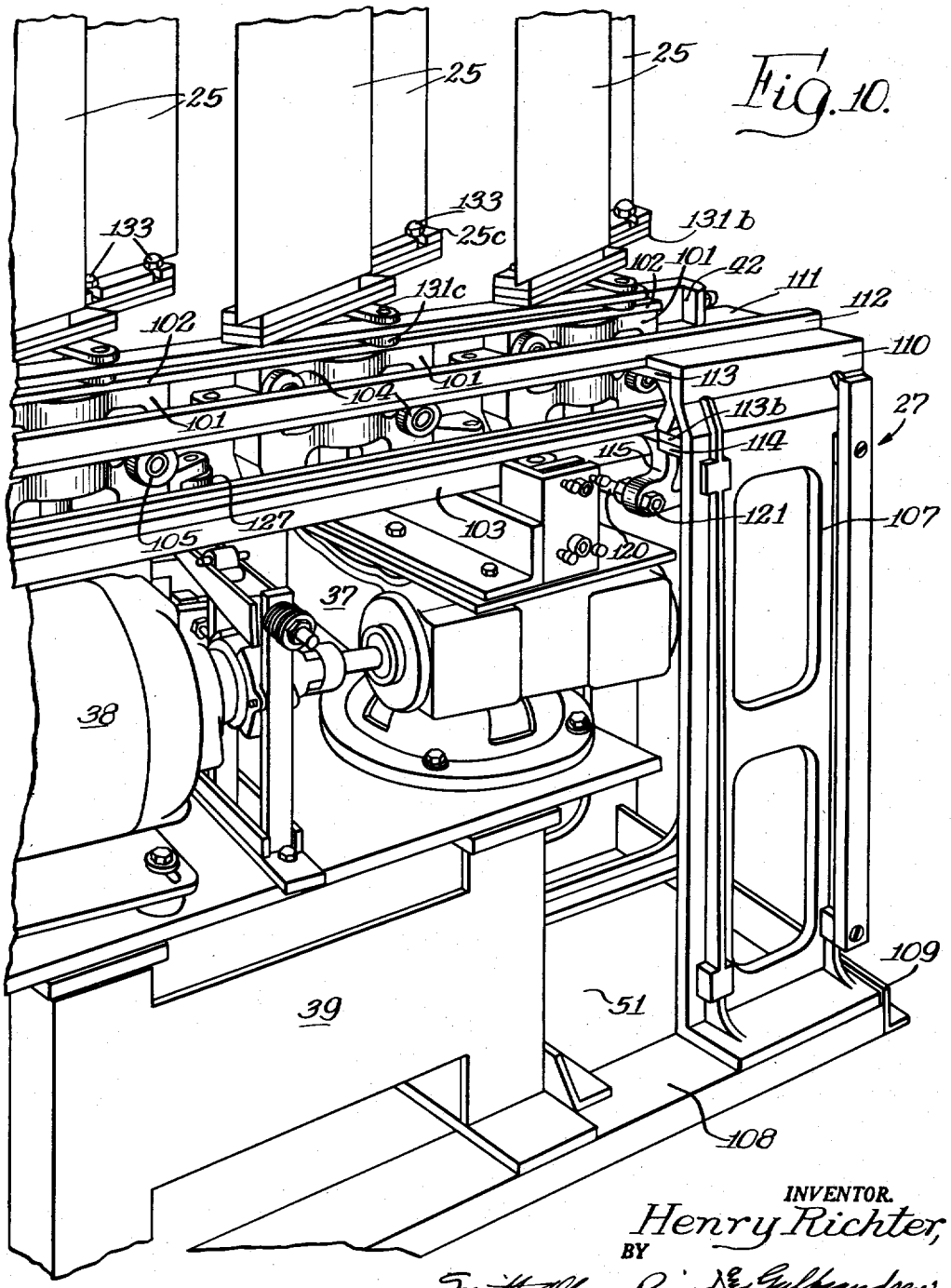
FIG. 10 is a perspective view of the track supporting structure and the right-hand end of the form supporting carriage on the outside of the retort at the right-hand end of the retort as viewed in FIG. 1.
Figure 11:
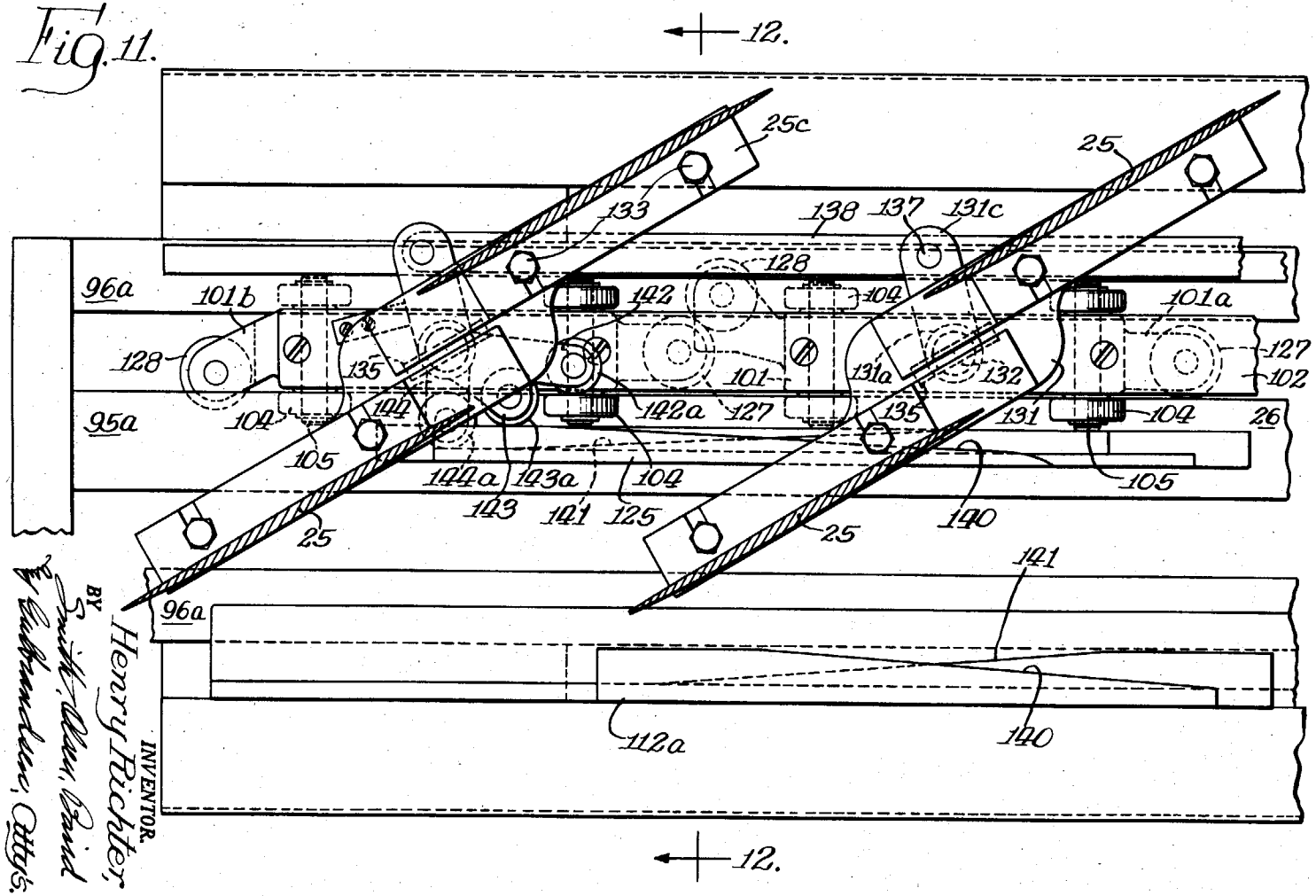
FIG. 11 is a view similar to FIG. 9 showing the left-hand end of the carriage supporting track and the form supporting carriage outside of the retort at the left-hand end of the retort as viewed in FIG. 1, with the forms shown in horizontal section.
Figure 12:
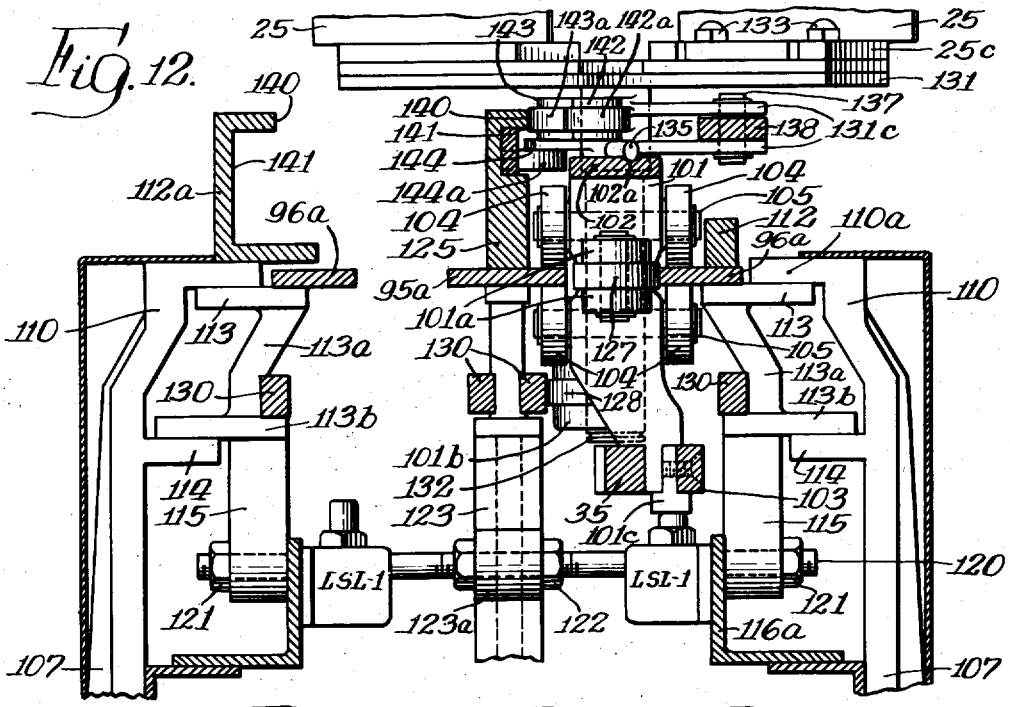
FIG. 12 shows a vertical section taken on the line 12—12 of FIG. 11.

Each carriage 23 in the embodiment of the invention illustrated is adapted to carry twenty-four of the hosiery forms 25 and two of these forms are mounted upon each of the carriage blocks 101 in such a manner that they may be moved into the overlapping relationship shown in the retort 20 in FIG. 1 or into the diagonal relationship shown outside of the retort in FIG. 1 and also in FIGS. 9, 10 and 11. In order that the forms 25 may be caused to occupy either of these positions, they are mounted in pairs on supporting plates 131 each of which is carried by a hub 131a secured upon a spindle 132 journaled in spaced bearings in an underlying carriage block 101. Each supporting plate 131 has two oppositely extending arms 131b which are offset with respect to the axis of rotation of the spindle 132. These offset arms 131b are each adapted to carry a hosiery form 25 which is constructed in the proper shape to receive and be fitted by a single stocking. The foot portions 25a of the forms are directed upwardly and the lower ends of the leg portions 25b are secured to plates 25c which are clamped by studs 133 to the underlying arms of the supporting members 131. The two hosiery forms 25 mounted upon a single support 131 are thus directed in planes which are offset with respect to each other and when the supports 131 are rotated about their vertical axes one of the forms 25 on one support is adaped to overlap another form on an adjacent support 131 so that all of the forms then occupy a minimum of space in a lateral direction when they are within the retort 20 as illustrated in FIG. 1. The hub portions 131a of the supporting members 131 are secured to the spindles 132 by pins 135 which project from opposite sides of the hub portion and rest upon the upper surface of the plate 102 of the carriage on which they are mounted. When the forms are within the retort, these pins 135 extend longitudinally of the retort, as shown in FIG. 13, and rest upon the flat top surface of the plate 102. When the supports 131 are turned in order to cause the forms 25 to assume the diagonal positions shown in FIGS. 9, 10 and 11, to facilitate the stripping and boarding of the forms, the pins 135 are adapted to drop into grooves 102a formed in the top surface of the plate 102, thus holding the forms in the desired diagonal positions while the operator is working upon them.

For the purpose of causing all of the form supports 131 to be actuated simultaneously in the same manner, each hub 131a is provided with a pair of laterally extending arms 131c which are pivotally connected by pins 137 to a link 138 extending longitudinally of the apparatus at one side of the series of forms, as illustrated particularly in FIGS. 9, 10 and 11.

The crank arms 131c for all of the form supports 131 are actually simultaneously through the link 138 by means of cam bars 140 and 141 which are secured to, or formed as parts of, the rails 125 and 112a, which are mounted in stationary positions with respect to the tracks 95a and 96a as heretofore described. The spindle 132 of each carriage, which is farthest removed from the retort when the carriage is outside of the retort, has fixed thereon three crank arms 142, 143 and 144 which have mounted on their free ends the respective rollers 142a, 143a and 144a. The angular positions of the crank arms 142 and 143 are such that when the carriage 23 moves outwardly from the retort the roller 142 engages the inclined surface of the cam 140 and initiates the turning of all of the crank arms 131c and the consequent turning of the forms 25 toward the positions shown in FIGS. 9, 10 and 11. As this turning movement continues, the roller 142a moves away from the surface of the cam 140 which is then engaged by the roller 143a so that, as the endwise motion of the carriage continues, the crank arm 143 finishes the turning of the forms until they are in fully open positions in readiness for stripping and boarding.

When the boarding of the forms has been completed on a carriage which is outside of the retort and that carriage begins its movement toward the retort in response to the action of one of the gears 36 on the rack bar 35 of that carriage, the roller 144a rides inwardly on the incline of the cam 141 and gradually returns the forms 25 to the overlapping relationship shown in FIG. 1, which relationship they assume before the carriage enters the retort. Thus, the forms are caused to occupy a minimum of space in the retort so that the volume of the chamber 46 may be so small as to require a minimum steam consumption for the treatment of the hosiery.

Figure 15A:
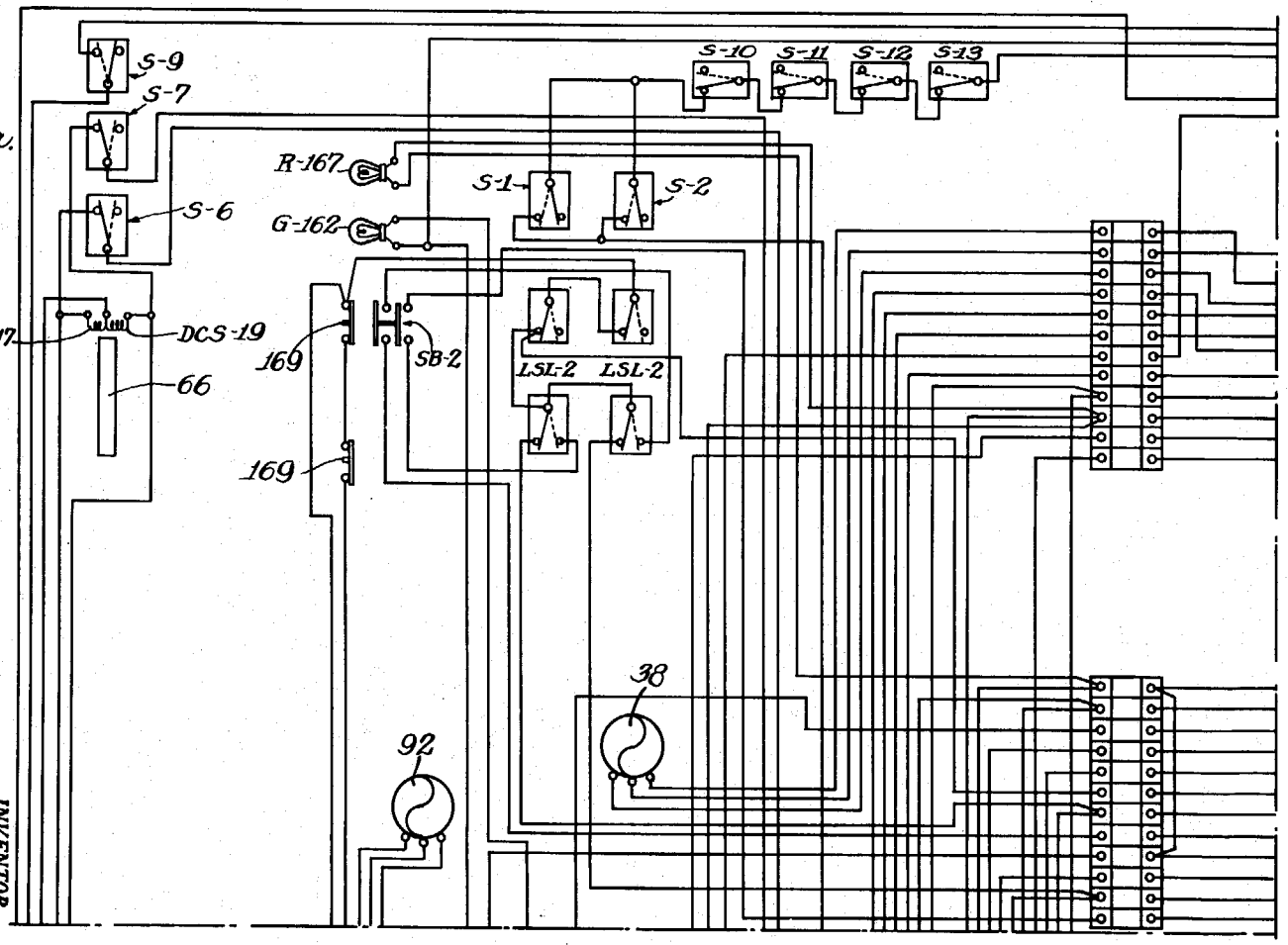
FIG. 15a shows the upper left-hand portion of a circuit diagram illustrating the connections of the operating circuit with the various parts by which the action of the apparatus illustrated in FIGS. 1 to 13, inclusive, is actuated and controlled.
Figure 15B:
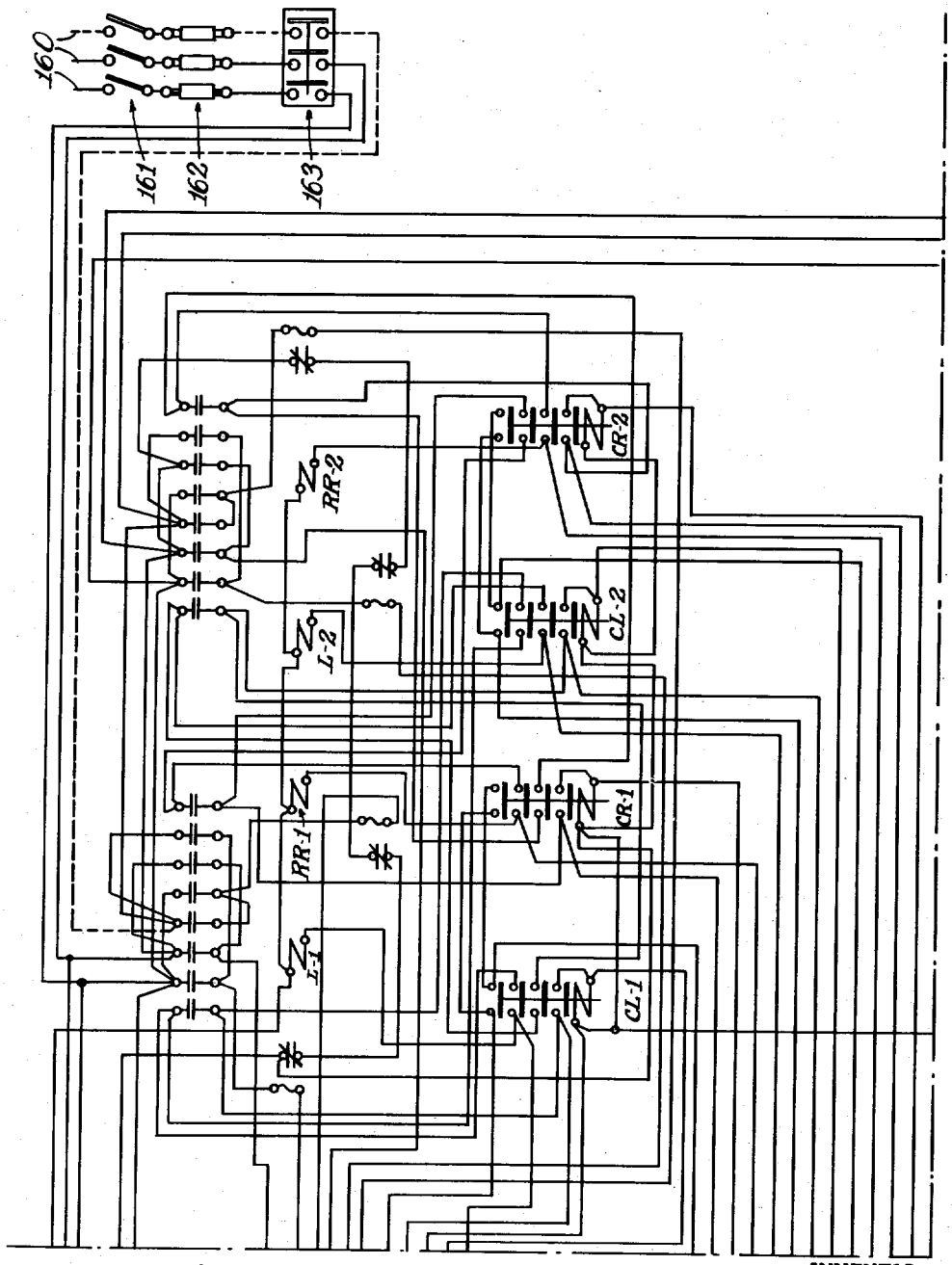
Figure 15C:
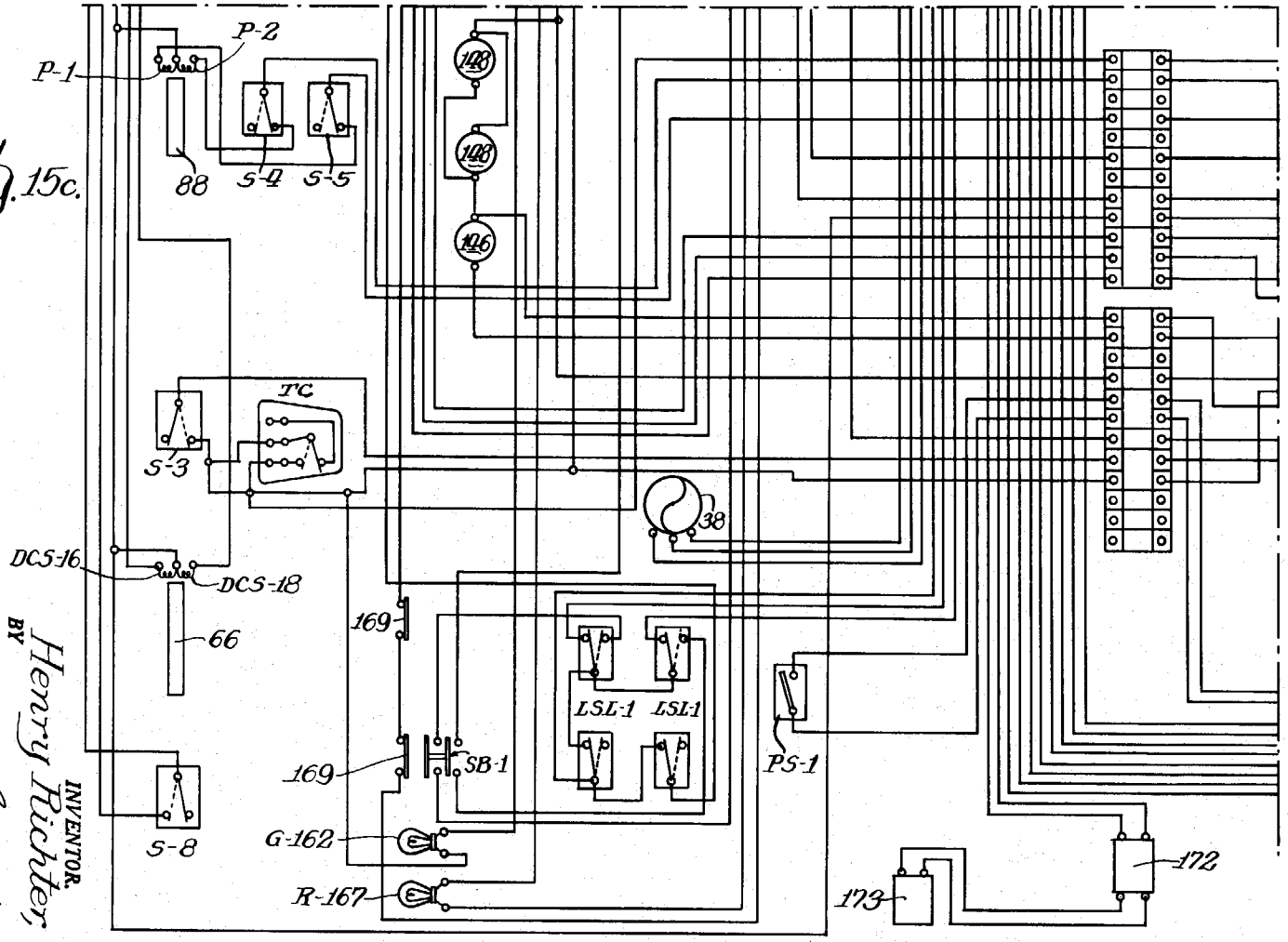
Figure 15D:
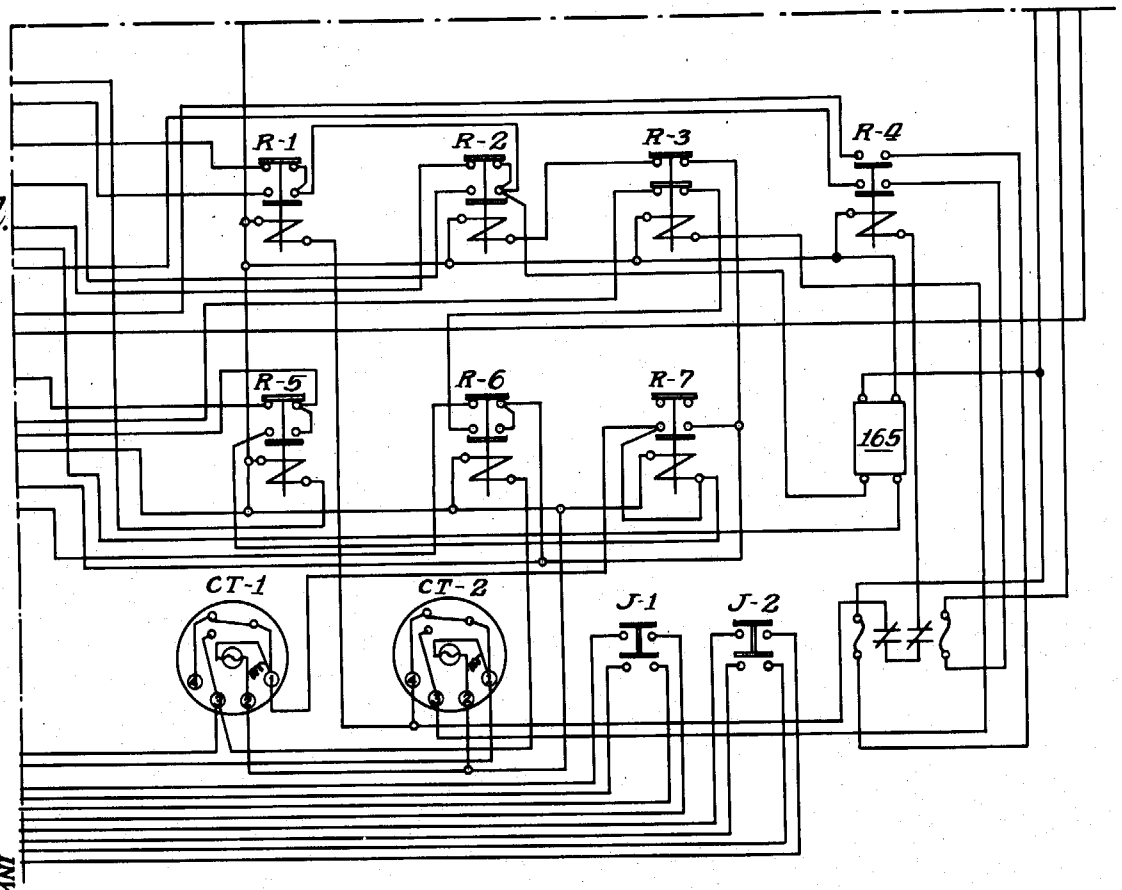

The steam having a pressure of about 30 pounds per square inch, is admitted to the chamber 46 of the retort 20 through inlets 145 (FIG. 4) controlled by a valve 146 (FIG. 15c) which is adapted to be automatically actuated, as hereinafter described, so that the steam enters as soon as the carriages 23 are in the retort and the doors 21 have been closed. At the end of the treating cycle the steam is automatically shut off and the steam pressure in the chamber is then relieved by two steam exhaust valves 148, located at opposite ends of the chamber in its bottom wall, which are then automatically opened so that steam and water of condensation, if any, may escape. When the pressure in the chamber is relieved by the opening of the exhaust valves 148, the air inlet and air exhaust valves 31 and 33 may be opened and air blown through the chamber for drying purposes.

The heating of the chamber 46 for drying is effected by steam pipes 150 mounted in horizontal parallel relationship on the inner faces of the longitudinal upright walls of the retort as shown in FIG. 7. Steam flows to these pipes through the inlets 151 (FIG. 4) and flows out through the outlets 152. The flow of steam through these pipes is controlled by manually operated valves which are normally left open when the apparatus is in use so that the retort is then heated continuously.

Other features of construction of the apparatus of the present invention will now be described in connection with the disclosure of the electric circuit and associated parts by which the apparatus is operated and controlled. This circuit is shown in the composite diagram made up of FIGS. 15a, 15b, 15c and 15d and comprises a three phase alternating current system including three line conductors 160 leading through a line switch 161 and fuses 162 to a cutoff switch 163 which is adapted to be opened when the apparatus is not in use. In the following description of the operation reference will be made to the right-hand and left-hand portions of the apparatus as viewed in FIGS. 1 and 2.

When the switches 161 and 163 are closed a circuit is established through the switches S–10, S–11, S–12, S–13 and S–1 and the normally closed contacts of the relay R–3, thereby energizing the relay R–2 and closing its normally open contacts to complete a circuit through the 8-volt transformer 165 and the normally closed switch S–6 to the solenoids DCS–16 and DCS–17 which control the operation of the cylinders 66 for closing the retort doors 21. This is the first stage of the operation and it is assumed that two carriages 23, having forms 25 which have been boarded, are in the chamber of the retort. The switches S–10, S–11, S–12 and S–13 are safety switches, one associated with each form carriage 23, which are positioned so that they are closed by these carriages only when they are stationary, thus preventing operation of the doors 21 when the carriage are in motion.

When the doors are closed, a cam (not shown) on the piston rod 68 of the left-hand door cylinder 66 closes a normally open switch S–3, thereby completing a circuit through the normally closed contacts of the relay R–5 to cause the steam feed valve 146 to open the steam inlets 145 and thereby admit steam under pressure to the chamber 46 of the retort, while at the same time energizing the green lights G–162 to signal to the operators that a treating cycle has begun. When the temperature in the retort reaches the desired value, the temperature controller TC–1 completes a circuit through the coil of the relay R–5, thereby energizing this relay to close its normally open contacts so that the relay R–7 is also thereby energized to close its normally closed contacts and start the operation of the automatic timer CT–1, of well known form, which will have been adjusted to measure the time period during which the steam treating operation continues. When the desired temperature is reached, the energization of the relay R–5 opens its normally closed contacts, thereby closing the steam feed valve 146 to stop the flow of steam. A two degree fluctuation of the temperature in the retort will cause the temperature controller TC–1 to energize and deenergize the relay R–5 so that the temperature in the retort will be maintained substantially constant while the treating cycle continues.

When the steam treatment has continued to the end of the period measured by the timer TC–1, the timer causes the relay R–6 to be energized, thereby deenergizing the temperature controller TC–1 and energizing the steam exhaust valves 148 through the relay R–6 and normally closed contacts of the relay R–3. A pressure switch PS–1 is mounted in the retort and is open when the chamber is filled with steam under pressure but when the steam pressure is relieved, the switch PS–1 closes automatically and completes a circuit through a drying timer CT–2 which is adapted to measure the period during which the drying cycle continues. When the timer CT–2 is energized, it energizes the relay R–4 through its contacts 4 and the closing of the contacts of the relay R–4 completes the circuit of the blower motor 92 so that the blower 91 is then actuated to blow air through the housing 90 and the ports 30 into the chamber 46 of the retort. At the same time, the relay R–1 is energized, thereby energizing the retracting solenoid P–1 by which the cylinder 88 is operated to actuate the valves 31 and 33 and thereby open the air inlet ports 30 and the air exhaust ports 32. The solenoid P–1 is energized from the 8-volt transformer 165, connected between 220-volt lines of the 3-phase circuit, through the then closed contacts of the relay R–1 and the normally closed contacts of the switch S–4.

When the drying timer CT–2 reaches the end of the drying period for which it is set, it deenergizes the relay R–4, thereby deenergizing the blower motor 92, and at the same time deenergizing the relay R–1. The normally closed contacts of the relay R–1 are thus restored and the solenoid P–2 is energized through the transformer 165 and the closed contacts of the switch S–5 to actuate the cylinder 88 and cause the closing of the doors 31 and 33. When the drying timer CT–2 operates at the end of its period, the relay R–3 is also energized, thereby opening its normally closed contacts to deenergize the relay R–2. When the relay R–2 is energized, the door cylinder retracting solenoids DSC–16 and DSC–17 are energized to actuate the cylinders 66 to open the doors 21. The circuits of these solenoids are completed through the transformer 165, the normally closed contacts of the relay R–2 and the normally closed switch S–7.

At this stage of the operations one steaming cycle has been completed and the doors 21 are open so that the two carriages 23 which have been in the retort may be moved out and the two carriages outside of the retort, carrying forms which have been stripped and boarded during the cycle, may now be moved in. This is brought about by the action of the two operators who occupy the two positions 28 indicated in FIG. 1. One operator presses the start button SB–1 and the other operator at the other end of the retort presses the start button SB–2. This energizes the holding relays CR–1 and CR–2, respectively, and energizes the red signal lights R–167 mounted on the retort. At the same time the selector switch relays RR–1 and RR–2 and the carriage driving motors 38 are actuated to drive the gears 36. The rack bars 35 are thus operated to move two carriages in opposite directions out of the retort and to move two other carriages in the same directions into the retort in the manner previously described.

The two carriages which are entering the retort chamber are disengaged from the carriages which are pulling them in the later stages of their movements, through the actuation of the latches 40 by the cams 41 and stops may be provided to engage the ends of the incoming carriages and bring them to rest promptly after the disengagement occurs. After the two carriages have stopped in the retort chamber, the other two carriages, which are being moved out of the retort by the gears 36, until the motors 38 are stopped by the actuation of normally closed switches LSL–1 and LSR–1 connected in the circuits of the left-hand and right-hand motors 38, respectively, and operated by cams (not shown) which move with the carriages and engage the switches as the carriages reach the boarding positions. At the same time that the switches LSL–1 and LSR–1 are opened, the normally open switch S–2 is closed, thereby actuating the door cylinder solenoids DCS–18 and DSC–19 which operate the cylinders 66 to close the doors 21 for starting another cycle.

During the next cycle the directions of movement of the carriages will be reversed and when the outgoing carriages reach the limits of their travel toward the boarding positions the motors 38 will again be stopped by the actuation of two other normally closed switches LSL–2 and LSR–2 actuated by cams 101c (FIG. 12) which are mounted to move with these carriages.

When the retort doors 21 have been opened at the end of a steaming and drying cycle, two of the carriages are moved into the retort and the two carriages which have been in the retort are moved out, as previously indicated. To initiate this reverse movement of the carriages, one operator presses the start button SB–1, as before, and the other operator presses the start button SB–2, thereby energizing the relays CL–2 and CL–1, respectively. At the same time the circuits of the motors 38 are closed so that the gears 36 actuate the appropriate rack bars to move the carriages in the desired directions.

Four stop switches 169 are connected in the circuit for emergency use. Two of these are mounted adjacent each operator's position and they may be actuated to arrest the operation of the apparatus in the event of any part not functioning properly. If the motors 38 are stopped by any one of the switches 169 and the cams on the carriages are out of engagement with the switches LSL–1, LSL–2, LSR–1 and LSR–2, the motors 38 can be started momentarily by actuating the jog switches J–1 and J–2 until the carriages have been moved sufficiently to cause their cams to engage either the switches LSL–1 and LSL–2 or the switches LSR–1 and LSR–2, whereupon the motors 38 may again be started for normal operation by actuating the start buttons SB–1 and SB–2.

A transformer 172 is connected in the circuit and arranged to operate a buzzer so that either operator may attract the attention of the other in the event that either start button SB–1 or SB–2 is about to be acuated by its operator before the operator at the other end of the retort has finished boarding the forms on the carriage at that position.

Although one embodiment of the invention has been shown and described by way of illustration, it will be understood that it may be constructed in various other forms without departing from the scope of the appended claims.

I claim:

1. The combination in apparatus for treating hosiery and the like, of an elongated upright retort having door openings at its opposite ends, a plurality of carriages movable into and out of said retort through said door openings, upright hosiery forms mounted on said carriages, and means for moving a carriage through one of said door openings and causing it to push another carriage through the other door opening.

2. The combination in apparatus for treating hosiery and the like, of an elongated upright retort having door openings at its opposite ends, a plurality of carriages movable in parallel paths through each of said door openings into and out of said retort, upright hosiery forms mounted on said carriages, means for moving a plurality of carriages in tandem along each of said paths, and means for coupling together the carriages which are moved in tandem.

3. The combination in apparatus for treating hosiery and the like, of an elongated upright retort having door openings at its opposite ends, a pair of carriages movable in tandem with respect to said door openings, hosiery forms mounted on said carriage, means for moving a carriage partially into said retort through one door opening and thereby pushing the other carriage partially through the other door opening, means for coupling said carriages together, and means for actuating said other carriage to complete its movement from said retort and to pull said first carriage entirely into said retort.

4. The combination in apparatus for treating hosiery and the like, of an elongated upright retort having door openings at its opposite ends, a pair of carriages movable in tandem with respect to said door openings, hosiery forms mounted on said carriage, means for moving a carriage partially into said retort through one door opening and thereby pushing the other carriage partially through the other door opening, means for coupling said carriages together, means for actuating said other carriage to complete its movement from said retort and to pull said first carriage entirely into said retort, and means for automatically uncoupling said carriages when said first carriage is entirely within said retort.

5. The combination in apparatus for treating hosiery and the like, of an elongated upright retort having door openings at its opposite ends, a pair of carriages movable in tandem with respect to said door openings, hosiery forms mounted on said carriages, means for moving either carriage through one door opening partially into said retort, means for automatically coupling that carriage to the other carriage during said movement, means for then moving said other carriage through the other door opening and thereby pulling said first carriage completely into said retort.

6. The combination in apparatus for treating hosiery and the like, of an elongated upright retort having door openings at its opposite ends, a pair of carriages movable in tandem with respect to said door openings, hosiery forms mounted on said carriages, means for moving either carriage through one door opening partially into said retort, means for automatically coupling that carriage to the other carriage during said movement, means for then moving said other carriage through the other door opening and thereby pulling said first carriage completely into said retort, and means for automatically uncoupling said carriages when said first carriage is entirely within said retort.

7. The combination in apparatus for treating hosiery and the like, of an elongated upright retort having door openings at its opposite ends, two pairs of carriages movable in parallel paths with respect to said door openings, the carriages of each pair being arranged in tandem, upright hosiery forms mounted on said carriages, means for moving one carriage of one pair in one direction partially into said retort through one of said door openings and thereby pushing the other carriage of that pair partially out of said retort through the other door opening, and means for simultaneously moving one carriage of the other pair in the opposite direction partially into said retort through said other door opening and thereby pushing the other carriage of said last named pair partially from said carriage through said first named door opening.

8. The combination in apparatus for treating hosiery and the like, of an elongated upright retort having door openings at its opposite ends, two pairs of carriages movable in parallel paths with respect to said door openings, the carriages of each pair being arranged in tandem, upright hosiery forms mounted on said carriages, means for moving one carriage of one pair in one direction partially into said retort through one of said door openings and thereby pushing the other carriage of that pair partially out of said retort through the other door opening, means for automatically coupling the carriages of that pair together during said movement, means for moving one carriage of the other pair in the opposite direction partially into said retort and also pulling said second carriage of said first pair out of said retort, and means for coupling said carriages of said second pair together, said means for moving said one carriage of the first pair being also adapted to pull said second carriage of said second pair from said retort.

9. The combination in apparatus for treating hosiery and the like, of an elongated upright retort having door openings at its opposite ends, a plurality of form supporting carriages movable through said door openings, tracks for supporting said carriages in said retort, other tracks for supporting said carriages outside of said retort at each end thereof, rack bars secured to said carriages and extending longitudinally of said tracks, gears adapted to mesh with said rack bars outside of said retort, and power driven means for actuating said gears.

10. The combination in apparatus for treating hosiery and the like, of an elongated upright retort having door openings at its opposite ends, a plurality of form supporting carriages movable through said door openings, tracks for supporting said carriages in said retort, other tracks for supporting said carriages outside of said retort at each end thereof, rack bars secured to said carriages and extending longitudinally of said tracks, gears adapted to mesh with said rack bars outside of said retort, and power driven means for actuating said gears, each of said gears being adapted to mesh with two rack bars on opposite sides thereof whereby the rotation of each gear is adapted to move one carriage into said retort and to move another carriage out of said retort.

11. The combination in apparatus for treating hosiery and the like, of a retort having a door opening, a pair of form supporting carriages movable in parallel paths through said door opening, rack bars secured to said carriages and extending longitudinally thereof in parallel relationship, a gear adapted to mesh with both of said rack bars, and means for actuating said gear to move one carriage toward said retort and the other carriage away from said retort.

12. The combination in apparatus for treating hosiery and the like, of an elongated upright retort having door openings at its opposite ends, a plurality of form supporting carriages movable through said door openings, tracks for supporting said carriages in said retort, other tracks for supoprting said carriages outside of said retort at each end thereof, rack bars secured to carriages and extending longitudinally of said tracks, said tracks being arranged to support two pairs of carriages movable thereon in tandem and in parallel paths through the same door openings, a pair of gears at opposite ends of the retort each arranged to mesh with the rack bars of one carriage of each pair outside of said retort, and means for actuating said gears to cause each gear to move a carriage of one pair into said retort and to move a carriage of the other pair out of said retort.

13. The combination in apparatus for treating hosiery and the like, of an elongated upright retort having door openings at its opposite ends, a plurality of form supporting carriages movable through said door openings, tracks for supporting said carriages in said retort, other tracks for supporting said carriages outside of said retort at each end thereof, rack bars secured to carriages and extending longitudinally of said tracks, said tracks being arranged to support two pairs of carriages movable thereon in tandem and in parallel paths, a pair of gears at opposite ends of the retort each arranged to mesh with the rack bars of one carriage of each pair outside of said retort, means for actuating said gears to cause each gear to move a carriage of one pair into said retort and to move a carriage of the other pair out of said retort, and means for automatically coupling the carriages of each pair together after a predetermined movement of one carriage of that pair into said retort, the rack bar of the other carriage of that pair being then arranged to mesh with the other gear at the other end of the retort whereby said other gear then pulls said first carriage of that pair further into the retort.

14. The combination in apparatus for treating hosiery and the like, of an elongated upright retort having door openings at its opposite ends, a plurality of form supporting carriages movable through said door openings, tracks for supporting said carriages in said retort, other tracks for supporting said carriages outside of said retort at each end thereof, rack bars secured to carriages and extending longitudinally of said tracks, said tracks being arranged to support two pairs of carriages movable thereon in tandem and in parallel paths, a pair of gears at opposite ends of the retort each arranged to mesh with the rack bars of one carriage of each pair outside of said retort, means for actuating said gears to cause each gear to move a carriage of one pair into said retort and to move a carriage of the other pair out of said retort, means for automatically coupling the carriages of each pair together after a predetermined movement of one carriage of that pair into said retort, the rack bar of the other carriage of that pair being then arranged to mesh with the other gear at the other end of the retort whereby said other gear then pulls said first carriage of that pair further into the retort, and means for automatically uncoupling the carriages of each pair when the first carriage of that pair has been pulled entirely into said retort.

15. The combination in apparatus for treating hosiery and the like, of a retort having an upright door opening, a carriage movable horizontally into said retort, a hosiery form mounted in upright position on said carriage, means for moving said carriage into said retort, and means for rotating said form on said carriage before said form enters said retort.

16. The combination in apparatus for treating hosiery and the like, of a retort having an upright door opening, a carriage movable horizontally into said retort, a plurality of upright hosiery forms mounted on said carriage, means for moving said carriage into said retort, and means for rotating all of said forms about vertical axes into the plane of movement of said carriage before they enter said retort.

17. The combination in apparatus for treating hosiery and the like, of a retort having a door opening, a carriage movable into said retort, a plurality of upright hosiery forms mounted on said carriage, means for moving said carriage into said retort, and means for rotating all of said forms about vertical axes and causing some of them to overlap in the plane of movement of said carriage during said movement.

18. The combination in apparatus for treating hosiery and the like, of a retort having an upright door opening, a carriage movable horizontally into said retort, a plurality of upright hosiery forms mounted in pairs on said carriage, means for automatically moving said carriage toward and from said retort, and means for rotating each pairs of said forms about a vertical axis during said movement.

19. The combination in apparatus for treating hosiery and the like, of a retort having a door opening, a carriage movable into said retort, a plurality of upright hosiery forms mounted in pairs on said carriage, the forms of each pair being located in offset planes with respect to each other and being rotatable as a unit about a vertical axis, means for moving said carriage into and out of said retort, and means actuated by said movement into said retort for rotating all of said forms about said axes and thereby causing each form of each pair to overlap a form of a next adjacent pair in the plane of movement of said carriage.

20. The combination in apparatus for treating hosiery and the like, of a retort having a door opening, a carriage movable into said retort, a plurality of upright hosiery forms mounted in pairs on said carriage, the forms of each pair being located in offset planes with respect to each other and being rotatable as a unit about a vertical axis, means for moving said carriage into and out of said retort, means actuated by said movement into said retort for rotating all of said forms about said axes and thereby causing each form of each pair to overlap a form of a next adjacent pair in the plane of movement of said carriage, and means actuated by said movement out of said retort for reversing said rotation of said forms and causing the forms of adjacent pairs to separate to permit free access thereto for boarding.

21. The combination in apparatus for treating hosiery and the like, of an elongated upright retort having a narrow internal chamber and door openings at its opposite ends, tracks in said retort and other tracks in alignment therewith outside of said door openings, a pair of carriages movable through opposite door openings in opposite directions into parallel relationship in said retort on said tracks, a plurality of substantially flat hosiery forms mounted in upright positions on said carriages, and means outside of said retort for rotating said forms about vertical axes when they are moved toward said retort, whereby all of said forms on both carriages lie parallel to each other and to the path of movement of said carriages in said retort.

22. The combination in apparatus for treating hosiery and the like, of an elongated upright retort comprising a single chamber having door openings at its opposite ends, a pair of form carriages, means for moving said carriages through said door openings into parallel relationship in said chamber, doors for closing said openings, means for automatically closing said doors when said carriages are in said retort, means for then admitting treating fluid under pressure into said retort, and means for shutting off the flow of said fluid after a predetermined period.

23. The combination in apparatus for treating hosiery and the like, of an elongated upright retort having door openings at its opposite ends, a pair of form carriages, means for moving said carriages through said door openings into parallel relationship in said retort, doors for closing said openings, means for automatically closing said doors when said carriages are in said retort, means for then admitting treating fluid under pressure into said retort, means for shutting off the flow of said fluid after predetermined period, means for then blowing air through said retort, and means for heating said retort.

24. The combination in apparatus for treating hosiery and the like, of an elongated upright retort having door openings at its opposite ends, a pair of form carriages, means for moving said carriages through said door openings into parallel relationship in said retort, doors for closing said openings, means for automatically closing said doors when said carriages are in said retort, means for then admitting treating fluid under pressure into said retort, means for shutting off the flow of said fluid after a predetermined period, means for then blowing air through said retort, means for heating said retort, means for automatically shutting off the flow of air after a predetermined period, and means for then automatically opening said doors.

25. The combination in apparatus for treating hosiery and the like, of an elongated upright retort having door openings at its opposite ends, a pair of form carriages, means for moving said carriages through said door openings into parallel relationship in said retort, doors for closing said openings, means for automatically closing said doors when said carriages are in said retort, means for then admitting treating fluid under pressure into said retort, means for shutting off the flow of said fluid after a predetermined period, means for then blowing air through said retort, means for heating said retort, means for automatically shutting off the flow of air after a predetermined period, means for then automatically opening said doors, and means for then moving said carriages out of said retort.

26. The combination in apparatus for treating hosiery and the like, of an elongated upright retort having door openings at its opposite ends, a pair of form carriages, means for moving said carriages through said door openings into parallel relationship in said retort, doors for closing said openings, means for automatically closing said doors when said carriages are in said retort, and means for preventing the closing of said doors when said carriages are in motion.

27. The combination in apparatus for treating hosiery and the like, of an upright elongated retort having a door opening at its end and having a door seat on its inner side around said opening, a door in said retort having a sealing flange adapted to engage said seat, means for admitting fluid under pressure into said retort to cause said flange to engage said seat when said door is in position opposite said opening, and means for moving said door in its own plane along a linear path to and from said position.

28. The combination in apparatus for treating hosiery and the like, of an upright elongated retort having a door opening at its end and having a door seat on its inner side around said opening, a door in said retort having a sealing flange adapted to engage said seat, means for admitting fluid under pressure into said retort to cause said flange to engage said seat when said door is in position opposite said opening, means for moving said door in its own plane along a linear path to and from said position, and means for moving said door away from said seat when it is moved away from said position.

*29. The combination for treating hosiery and the like, of a hosiery treating chamber having a hosiery treating position therein, a pair of carriages movable in tandem with respect to said hosiery treating position, hosiery forms mounted on said carriages, means for moving a first one of said carriages partially into said treating position and thereby pushing the other of said carriages partially out of said position, means for coupling said carriages together, and means for actuating said other carriage to complete its movement out of said treating position and to pull said first carriage entirely into said treating position.*

*30. The combination for treating hosiery and the like, of a hosiery treating mechanism having a hosiery treating position, a pair of carriages movable in tandem with respect to said hosiery treating position, hosiery forms mounted on said carriages, means for moving a first one of said carriages partially into said treating position and thereby pushing the other of said carriages partially out of said position, means for coupling said carriages together, means for actuating said other carriage to complete its movement out of said treating position and to pull said first carriage entirely into said treating position, and means for uncoupling said carriages when said first carriage is entirely within said treating position.*

References Cited in the file of this patent or the original patent

UNITED STATES PATENTS

| | | |
|---|---|---|
| 227,451 | Scott | May 11, 1880 |
| 1,409,584 | Ross | Mar. 14, 1922 |
| 2,299,040 | Schwartz | Oct. 13, 1942 |
| 2,321,452 | Berger et al. | June 8, 1943 |
| 2,646,194 | Berger et al. | July 21, 1953 |
| 2,736,105 | Berger et al. | Feb. 28, 1956 |
| 2,750,781 | Bailey | June 19, 1956 |